(12) United States Patent
Zhang et al.

(10) Patent No.: US 9,378,407 B2
(45) Date of Patent: Jun. 28, 2016

(54) AUTOMATED FISH READER USING LEARNING MACHINES

(71) Applicant: NEOGENOMICS LABORATORIES, Fort Myers, FL (US)

(72) Inventors: Hong Zhang, Savannah, GA (US); Maher Albitar, Valley Center, CA (US)

(73) Assignee: Neogenomics Laboratories, Inc., Fort Myers, FL (US)

( * ) Notice: Subject to any disclaimer, the term of this patent is extended or adjusted under 35 U.S.C. 154(b) by 200 days.

(21) Appl. No.: 14/024,474

(22) Filed: Sep. 11, 2013

(65) Prior Publication Data
US 2014/0072195 A1    Mar. 13, 2014

Related U.S. Application Data

(60) Provisional application No. 61/699,301, filed on Sep. 11, 2012.

(51) Int. Cl.
*G06K 9/00* (2006.01)
*G06T 7/00* (2006.01)

(52) U.S. Cl.
CPC .......... *G06K 9/00147* (2013.01); *G06K 9/0014* (2013.01); *G06T 7/0012* (2013.01); *G06T 2207/10024* (2013.01); *G06T 2207/10056* (2013.01); *G06T 2207/20061* (2013.01);
(Continued)

(58) Field of Classification Search
CPC ... G06K 9/00523; G06K 9/4652; G06K 9/34; G06K 9/00147; G06T 7/0012; G06T 2207/20061; G06T 2207/30004
See application file for complete search history.

(56) References Cited

U.S. PATENT DOCUMENTS

| | | | |
|---|---|---|---|
| 5,427,910 A | 6/1995 | Kamentsky et al. | |
| 6,996,549 B2 * | 2/2006 | Zhang et al. | 706/16 |

(Continued)

FOREIGN PATENT DOCUMENTS

WO    0120044 A2    3/2001

OTHER PUBLICATIONS

Lerner et al., "Feature Representation and Signal Classification in Fluorescence In-Situ Hybridization Image Analysis", Nov. 2001, IEEE Transactions on Systems, Man, and Cybernetics—Part A: Systems and Humans, Vol. 31, No. 6, pp. 655-665, AAPA.*

(Continued)

*Primary Examiner* — Vu Le
*Assistant Examiner* — Guillermo Rivera-Martinez
(74) *Attorney, Agent, or Firm* — Greer, Burns & Crain, Ltd.

(57) ABSTRACT

An automated reader for reading fluorescence in-situ hybridization signals includes one or more computer processors for receiving a digitized FISH image and executing the steps of converting colors within the image to a hue value, separately for each color extracting quantitative values to detect the presence of signals corresponding to spots and applying a plurality of algorithms to extract features from the signals to determine cell shapes and segment cells within the FISH image. After recombining the signals, the extracted features for the colors learning machines are used to classify the spots according to the color and separate merged signals of classified spots that are in close proximity to each other within the image. The classified spots are counted to determine relative frequency of colors and a report is generated providing the number of classified spots of each color.

22 Claims, 13 Drawing Sheets

(52) U.S. Cl.
CPC ............... *G06T2207/20072* (2013.01); *G06T 2207/20076* (2013.01); *G06T 2207/20081* (2013.01); *G06T 2207/30024* (2013.01); *G06T 2207/30242* (2013.01)

(56) References Cited

U.S. PATENT DOCUMENTS

| | | | |
|---|---|---|---|
| 7,219,016 | B2 | 5/2007 | Rimm et al. |
| 7,887,750 | B2 | 2/2011 | Blatt et al. |
| 2002/0177149 | A1* | 11/2002 | Rimm et al. ..................... 435/6 |
| 2003/0004652 | A1* | 1/2003 | Brunner et al. ................ 702/19 |
| 2003/0143524 | A1* | 7/2003 | Lerner ............................. 435/5 |
| 2004/0047499 | A1* | 3/2004 | Shams ......................... 382/129 |
| 2005/0265588 | A1 | 12/2005 | Gholap et al. |
| 2013/0183707 | A1* | 7/2013 | Mangoubi et al. ............. 435/29 |
| 2013/0208950 | A1 | 8/2013 | Athelogou et al. |

OTHER PUBLICATIONS

International Search Report and Written Opinion mailed Jan. 14, 2014, in International Application PCT/US2013/059288, filed on Sep. 11, 2013, 9 pages.

Barr Fritcher, E.G., et al., "A comparison of conventional cytology, DNA ploidy analysis, and fluorescence in situ hybridization for the detection of dysplasia and adenocarcenoma in patients with Barrett's esophagus", Human Pathol. Aug. 2008; 39(8): 1128-1135.

Brankley, S.M., et al., "The Development of a Fluorescence in Situ Hybridization Assay for the Detection of Dysplasia and Adenocarcenoma in Barrett's Esophagus", Journal of Molecular Diagnostics, May 2006, vol. 8, No. 2, pp. 260- 267.

David, A. & Lerner, B., "Signal Discrimination Using a Support Vector Machine for Genetic Syndrome Diagnosis", 17th International Conf. on Pattern Recognition (ICPR2004), Aug. 23-26, Cambridge, UK, 4 pages.

David, A. & Lerner, B., "Support vector machine-based image classification for genetic syndrome diagnosis", Pattern Recognition Letters 26 (2005) 1029-1038.

Lerner, B., et al., "Automatic Signal Classification in Fluorescence In Situ Hybridization Images", Cytometry, 2001 43:87-93.

Lerner, B., "Bayesian fluorescence in situ hybridisation signal classification", Artificial Intelligence in Medicine, 30 (2004) 301-316.

Lerner, B., et al., "On the Classification of a Small Imbalanced Cytogenetic Image Database", IEEE/ACM Trans. on Computational Biology and Bioinformatics, Apr.-Jun. 2007, vol. 4, No. 2, 204-215.

Lerner, B., et al., "Segmentation and Classification of Dot and Non-Dot-Like Fluorescence in situ Hybridization Signals for Automated Detection of Cytogenetic Abnormalities", IEEE Trans. on Information Technology in Biomedicine, Jul. 2007, vol. 11, No. 4, 443-449.

\* cited by examiner

- Select Mode
  Oval
  Rect
  Freehand
  Delete Selected Shape
- Include Mode
  Exclude Mode
  Create Mask and Run
  Clear Mask and Run

AUTOMATED FISH READER USING LEARNING MACHINES

RELATED APPLICATIONS

This application claims the benefit of the priority of U.S. Provisional Application No. 61/699,301, filed Sep. 11, 2012.

FIELD OF THE INVENTION

The present invention relates to a computer-implemented method for automatically identifying and quantifying cellular structures tagged using fluorescence in-situ hybridization (FISH).

BACKGROUND OF THE INVENTION

In recent years, fluorescence in-situ hybridization (FISH) has emerged as one of the most significant new developments in the analysis of human chromosomes. FISH offers numerous advantages compared with conventional cytogenetics techniques because it allows detection of numerical chromosome abnormalities during normal cell interphase.

Historically, FISH and other in situ hybridization results played a primary role in mapping genes on human chromosomes. Results from these experiments were collected and compiled in databases, and this information proved useful during the annotation phase of the Human Genome Project (HGP). Now that the HGP is complete, investigators rarely use in situ hybridization simply to identify the chromosomal location of a human gene. (In species for which the genome has not been sequenced, however, FISH and related in situ hybridization methods continue to provide important data for mapping the positions of genes on chromosomes.) Currently, human FISH applications are principally directed toward clinical diagnoses. Biomedical applications include identification of genetic bases for developmental disabilities, diagnosis and prognosis of diseases such as cancer, identification of pathogens, deduction of evolutionary relationships, and microbial ecology.

The basic elements of FISH are a DNA probe and a target sequence. Before hybridization, the DNA probe is labeled by various means, such as nick translation, random primed labeling, and PCR. Two labeling strategies are commonly used: indirect labeling and direct labeling. For indirect labeling, probes are labeled with modified nucleotides that contain a hapten, whereas direct labeling uses nucleotides that have been directly modified to contain a fluorophore. The labeled probe and the target DNA are denatured. Combining the denatured probe and target allows the annealing of complementary DNA sequences. If the probe has been labeled indirectly, an extra step is required for visualization of the non-fluorescent hapten that uses an enzymatic or immunological detection system. Whereas FISH is faster with directly labeled probes, indirect labeling offers the advantage of signal amplification by using several layers of antibodies, and it might therefore produce a signal that is brighter compared with background levels.

An important application of FISH is dot counting, i.e., the enumeration of signals (dots) within the nuclei, where the dots in the image represent the inspected chromosomes and, more particularly, the locations at which hybridization with one or more labeled probes has occurred. Dot counting is used for diagnosing numerical chromosomal aberrations, for example, in haematopoietic neoplasia, solid tumors and prenatal diagnosis.

A major limitation of the FISH technique for dot counting is the need to examine large numbers of cells. The large numbers are required for an accurate estimation of the distribution of chromosomes over the cell population, especially in applications involving a relatively low frequency of abnormal cells. Visual evaluation by a trained cytogeneticist of large numbers of cells and enumeration of hybridization signals is tedious, time consuming and expensive. Ideally, the analysis process could be expedited by automating the procedure. Unfortunately, there are many obstacles to be overcome before automated analysis of FISH images can be implemented on a widespread basis. Because signals are distributed in three-dimensions within the nucleus, valid signals can be missed. Additional obstacles include that the cells are not usually well defined, there are no clear boundaries between cells, overlapping of cells is common, and cells are frequently only partially visible in an image.

A neural network was proposed by B. Lerner, et al. for distinguishing between real signals and artifacts resulting from noise and out-of-focus object within FISH images. The neural network is trained to discriminate between in and out-of focus images. Images that contain no artifacts are the in-focus images selected for dot count proportion estimation. This assay emphasizes on classification of real signals and artifacts. It does not address the problems of further analysis, such as separating overlapping nuclei or dot counting. ("Feature representation and signal classification in fluorescence in-situ hybridization image analysis", *IEEE Trans. on Systems, Man and Cybernetics A*, 31, pp. 655-665 (2001). David and Lerner have applied support vector machines (SVMs) for analysis of FISH signals ("Signal discrimination using a support vector machine for genetic syndrome diagnosis", in $17^{th}$ International Conf. on Pattern Recognition (ICPR2004), 2004, 23-26 Aug., Cambridge, UK. In this work, the authors used SVM classification to separate real signals from artifacts and red signals from green signals. Overlap among the simple binary classes presented a problem that significantly reduced accuracy. An extension of the prior study was reported in "Support vector machine-based image classification for genetic syndrome diagnosis", *Pattern Recognition Letters* 26 (2005) pp. 1029-1038.) As before, overlap of classes resulted in rejection of patterns which may have been important for accurate classification. The reduction of the available patterns for classification leads to a small and heavily imbalanced database. This imbalance produces biased training in which majority classes dominate the decision boundaries, further reducing the prediction accuracy of the overall method. Accordingly, the need remains for a method and system for accurate automated computer classification of FISH data.

SUMMARY OF THE INVENTION

A method and system for automated analysis of fluorescent in situ hybridization (FISH) images based is provided. The inventive FISH reader program pre-processes the digitized FISH image to select analysis regions, segment objects within selected regions, separate color signals and measure signals for each separated color. Prior to classification of the data extracted from the FISH images, analysis regions are selected, spot colors are separated and signals are measured for each separated color. Different components of the data may be analyzed separately using different learning machines, such as neural networks, decision trees, regression or support vectors machines. For example, a first learning machine may be used to classify spots according to color, while a second learning machine may be used to distinguish signals where the cell in the image is partially obscured by another cell overlapping the cell. The separation of the classification functions allows the learning machine to be optimized for the specific attribute of interest. The results are then merged to produce an output that is based on the most useful (determinative) features within the image and optimized to overcome issues that are particularly problematic in FISH analyses. An exemplary disclosure of multiple SVM architecture and analysis is provided in U.S. Pat. No. 6,996,549 of Zhang, et al., the disclosure of which is incorporated herein by reference. In one embodiment, separate learning machines perform their analyses sequentially then merge the results to produce the analysis for output (or further processing). In another embodiment, the learning machines may perform their respective operations in parallel in a first round of classification, and an additional learning machine may be used to combine the first round outputs in a second round of classification to generate a single conclusion, e.g., a diagnosis, based on the individual test results.

In one aspect of the invention, an automated reader for reading fluorescence in-situ hybridization signals includes one or more computer processors for receiving a digitized FISH image comprising a plurality of spots having colors, wherein the one or more processors is programmed to execute the steps of: converting colors within the FISH image to a hue value; separately for each color: extracting a plurality of quantitative values to detect the presence of signals corresponding to spots; and applying a plurality of algorithms to extract features from the signals to determine cell shapes and segment cells within the FISH image; recombining the extracted features for the colors; classifying the plurality of spots according to the color of the spot; separating merged signals of classified spots that are in close proximity to each other within the FISH image; counting the classified spots to determine relative frequency of colors; and generating a report of the number of classified spots of each color. In some embodiments, the steps of classifying the plurality of spots and separating merged signals are performed by a learning machine. The learning machine may be a support vector machine. The plurality of algorithms to extract features may include one or more of a Hough transform, a Markov random field model and a Gaussian mixture model. The one or more processor may be further programmed to associate signals with cells within the FISH image. A user interface may include a masking tool for manually selecting one or more regions within the FISH image for analysis and/or excluding one or more regions within the FISH images from analysis.

In another aspect of the invention, a method reading fluorescence in-situ hybridization signals using one or more computer processors includes receiving a digitized FISH image comprising a plurality of spots having colors; converting colors within the FISH image to a hue value; separately for each color: extracting a plurality of quantitative values to detect the presence of signals corresponding to spots; and applying a plurality of algorithms to extract features from the signals to determine cell shapes and segment cells within the FISH image; recombining the extracted features for the colors; classifying the plurality of spots according to the color of the spot; separating merged signals of classified spots that are in close proximity to each other within the FISH image; counting the classified spots to determine relative frequency of colors; and generating a report of the number of classified spots of each color. In some embodiments, the steps of classifying the plurality of spots and separating merged signals are performed by a learning machine. The learning machine may be a support vector machine. The plurality of algorithms to extract features may be one or more of a Hough transform, a Markov random field model and a Gaussian mixture model. The one or more processor may be further programmed to associate signals with cells within the FISH image. A user interface may include a masking tool for manually selecting one or more regions within the FISH image for analysis and/or excluding one or more regions within the FISH images from analysis.

DETAILED DESCRIPTION

For purposes of the description of the invention, the terms "dot" or "spot", or pluralities thereof, may be used interchangeably to refer to the detected fluorescence signal(s) resulting from hybridization of tagged probes with target sequences for the detection of abnormalities using tissue sections or cell samples.

Figure 1:
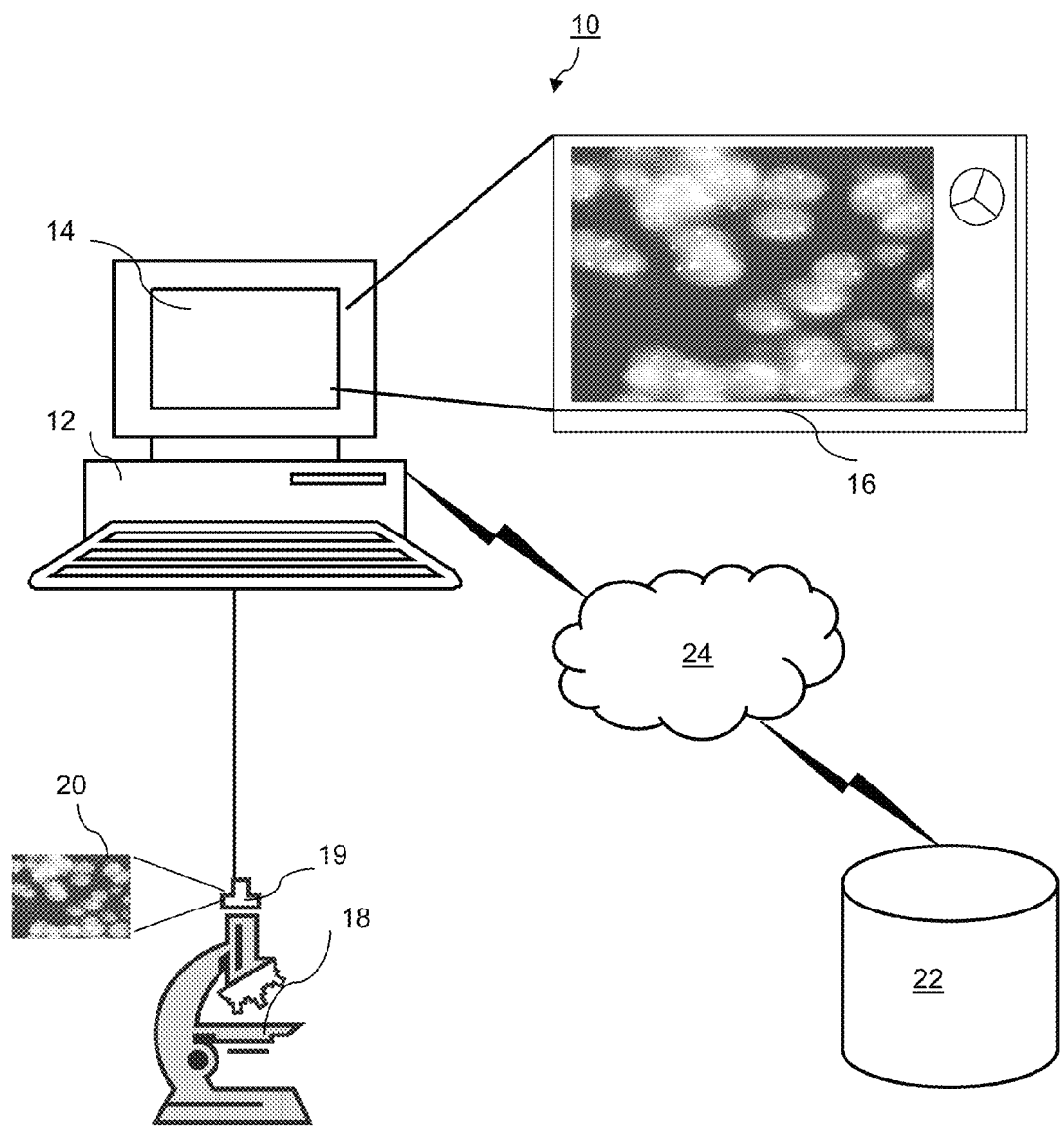
FIG. 1 is a block diagram of an exemplary automated FISH reader according to the present invention.

FIG. 1 is a block diagram illustrating an exemplary automated fluorescence in situ hybridization (FISH) analysis system 10. The exemplary system 10 includes one or more computers 12 with a display 14 (one of which is illustrated). The display 14 presents a windowed graphical user interface ("GUI") 16 to a user. The display 14 may be a touch screen, allowing entry of selections using the screen, or a user interface in the form of a mouse, stylus, touch pad, trackball, or other device may be connected by cable or wireless link to the computer 12.

The system 10 further includes a microscope 18 with a digital detector 19 such as a camera or other optical detector to provide digital images 20 in digital image or digital data formats. One or more databases 22 (one of which is illustrated) include biological sample information in various digital images or digital data formats. The database 22 may also include raw and processed digital images and may further include knowledge databases created from automated analysis of the digital images 20, report databases and other types of databases. The database 22 may be integral to a memory system on the computer 12 or in secondary storage such as a hard disk, floppy disk, optical disk, or other non-volatile mass storage devices. The computer 12 and the database 22 may also be connected via cable or by one or more communications networks 24.

The computer 12 may be replaced with client terminals in communications with one or more servers, or with personal digital/data assistants (PDA), laptop computers, mobile computers, Internet appliances, one or two-way pagers, mobile phones, or other similar desktop, mobile or hand-held electronic devices. The communications network 24 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 24.

The communications network 24 may include one or more servers and one or more web-sites accessible by users to send and receive information useable by the one or more computers 12. The one or more servers may also include one or more associated databases for storing electronic information.

The database 22 may include digital images 20 of biological samples taken with a camera or other optical detector and stored in a variety of digital image formats including, bitmapped, joint pictures expert group (JPEG), graphics interchange format (GIF), etc.

The following detailed description of an exemplary embodiment describes an automated FISH reader that is based on support vector machines. As will be apparent to those of skill in the art, other forms of machine technologies, including artificial neural networks, decision trees, and regression among others, may also be used.

In one embodiment, a multiple SVM architecture and analysis approach similar to that described in U.S. Pat. No. 6,996,549 of Zhang, et al. is employed. The disclosure of the '549 patent is incorporated herein by reference.

Figure 2:
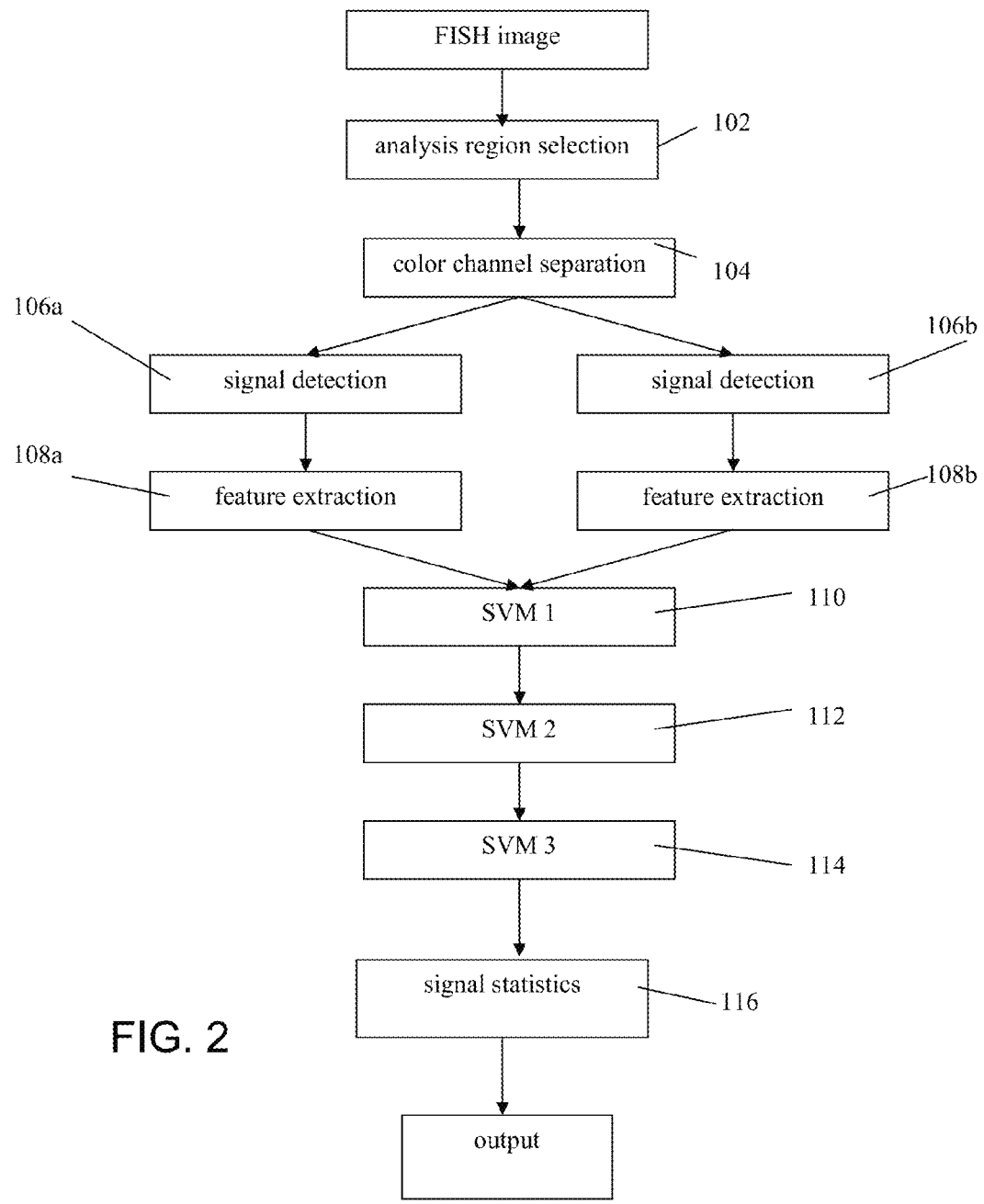
FIG. 2 is a block diagram of the processing modules of the automated FISH reader.
Figure 3A:
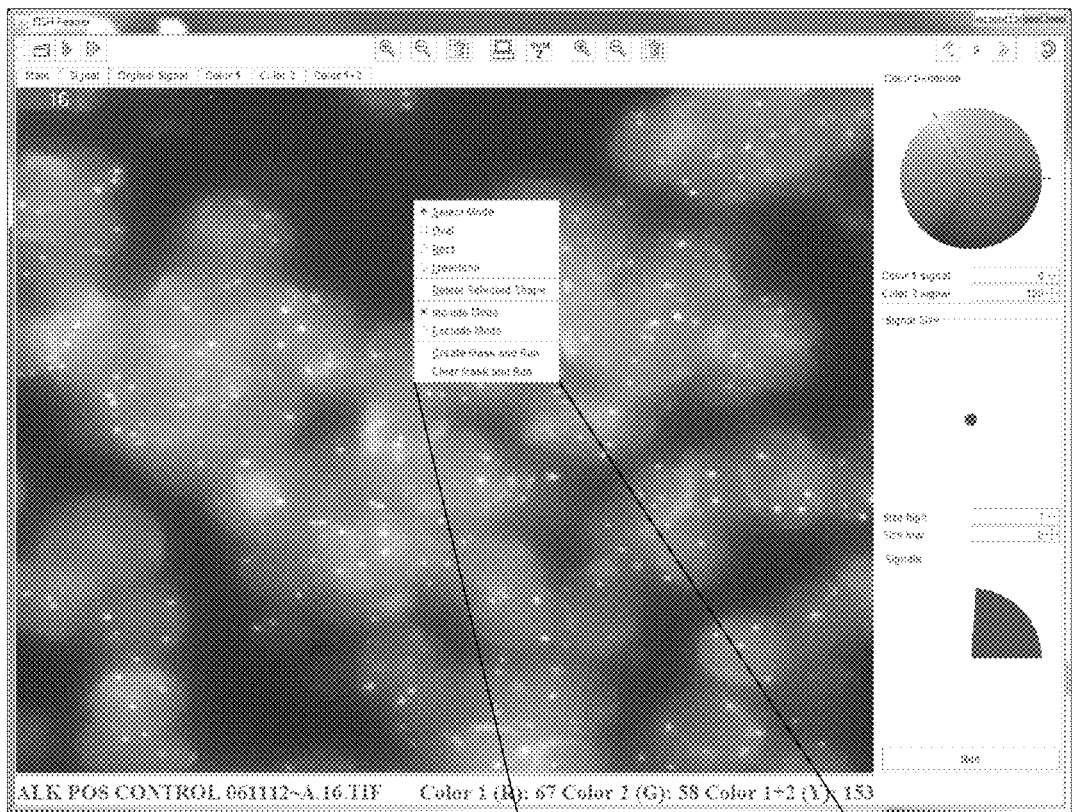
FIGS. 3a-3c are images showing approaches to analysis region selection.
Figure 3B:
Figure 3C:
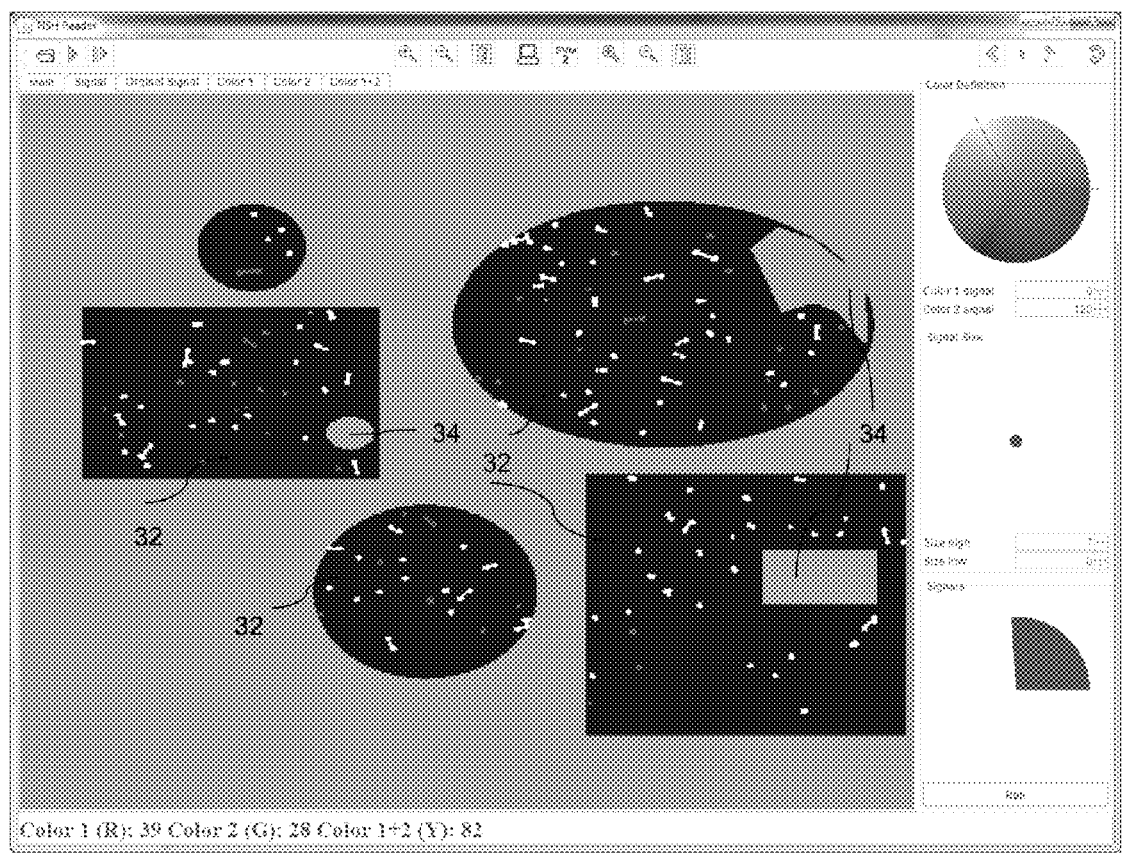

FIG. 2 is a block diagram of the architecture 100 of a computing system for performing the exemplary embodiment of the invention. In the first step 102, regions are selected for analysis. In one embodiment, the analysis program may provide drawing tools in different shapes allowing the user to manually select, or "mask", one or more areas of interest within the image. Examples of possible masking shapes include polygons, ovals and free-form shapes. In the sample screen display shown in FIG. 3a, three types of mask shapes are provided for selection: rectangles, ovals and free-hand shapes. Multiple shapes, connected or disconnected, of arbitrary combinations of types may be drawn using the mask tools. In one implementation, the user selects the desired tool and moves the cursor to the location on the screen corresponding to the area of interest then drags the shape to the size needed to enclose the desired area. Other approaches for selecting areas within the image may be used and will be readily apparent to those of skill in the art Two modes of shape definition may be used for masking. By selecting the "Include Mode", the area within a shape the user draws will be included in the analysis region. Selection of the "Exclude Mode" when drawing a shape will exclude that area from the analysis. FIG. 3b illustrates a combination of included and excluded selections, where the dark outline designates an area to be included and a light outline indicates an area to be excluded. Once the desired selections have been made, the user selects "Create Mask and Run" to begin the automated processing of the selected areas only. If different areas are desired, the user can move and/or re-size the shapes, or the option of "Clear Mask and Run" can be selected to perform analysis on the entire image without masking. FIG. 3c shows the analysis region on which the computer-aided analysis will be performed after applying the masking shown in FIG. 3b to exclude areas of the image outside of the selected "Include Mode" areas 32 and the selected "Exclude Mode" areas 34 within the "Include Mode" analysis regions.

Referring again to FIG. 2, step 104 involves color channel separation. In an exemplary embodiment, the program provides for the accurate definitions of colors for the stains used in the FISH images using the HSI (hue-saturation-intensity) model, which decouples the intensity component from the color-carrying components. The hue values in the HSI color space are then used to define the color channels.

Figure 4:
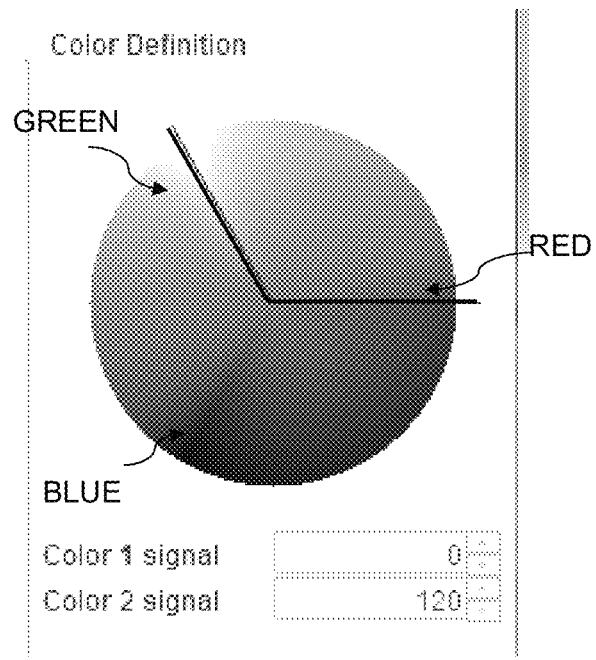
FIG. 4 is a diagram showing a color dial for distinguishing colors using a HSI model.

The program may implement a color dial to allow a user to select the colors easily by using hue values. FIG. 4 illustrates an exemplary representation of the color definitions for the channels of pure red ("Color 1 signal": 0 degree) and green ("Color 2 signal": 120 degrees). With the hue values of the color channels specified, the image processing program decomposes the original color image into component images corresponding to the hue specifications. This decomposition is achieved through a linear projection in the color space using the following algorithm:

Let h be a hue value measured in degrees and r, g, b the RGB component coefficients. The projection is defined by:

$$\text{if } 0 \leq h < 120$$
$$r = \frac{1}{3}\left(1 + \frac{\cos(h)}{\cos(60-h)}\right)$$
$$g = 1 - r$$
$$b = 0$$
$$\text{if } 120 \leq h < 240$$
$$r = 0$$
$$g = \frac{1}{3}\left(1 + \frac{\cos(h-120)}{\cos(180-h)}\right)$$
$$b = 1 - g$$
$$\text{if } 240 \leq h < 360$$

After following color channel separation step 104, the color channels are split so that each follows a separate, parallel path for detection and feature extraction. In steps 106a and 106b, each channel component is a gray level image. The goal of this processing stage (step 106) is to extract FISH signals in the channel and remove artifacts and noise. Image processing techniques, both global and local, are applied to achieve a clean segmentation of the signal spots.

Figure 5:
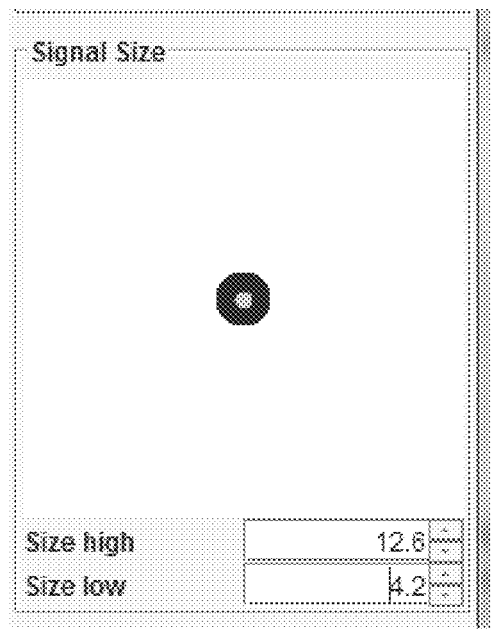
FIG. 5 is a diagram showing a size selection widget.

The resolutions of the images and the sizes of the signals can vary significantly. The program implements a size selection widget, shown in FIG. 5, to control the parameter related to signal sizes.

A set of quantitative measures are calculated on the detected signal candidates:

Perimeter—The contour of a spot is traced and its arc length gives the perimeter.

Area—The area of a spot is computed with a fast algorithm based on the contour alone:

$$\text{area} = \frac{1}{2}\sum_{i=1}^{n}(x_i y_{i+1} - x_{i+1} y_i)$$

Compactness—A measure comparing the border length to the enclosed area:

$$\text{compactness} = \frac{\text{perimeter}^2}{\text{area}}$$

Eccentricity—A measure of elongation.

$$\text{eccentricity} = \frac{(\mu_{xx} - \mu_{yy})^2 + 4\mu_{xy}}{\text{area}}$$

Intensity statistics—Average, max, min, variance of intensity.

Moments—Moments of various orders.

$$\mu_{pq} = \sum_{i=-\infty}^{\infty} \sum_{j=-\infty}^{\infty} ((x_i - \bar{x})^p (y_j - \bar{y})^q f(x_i, y_j))$$

These measurements can be used to eliminate artifacts and to provide features for the classifiers in the later stages.

Figure 6A:
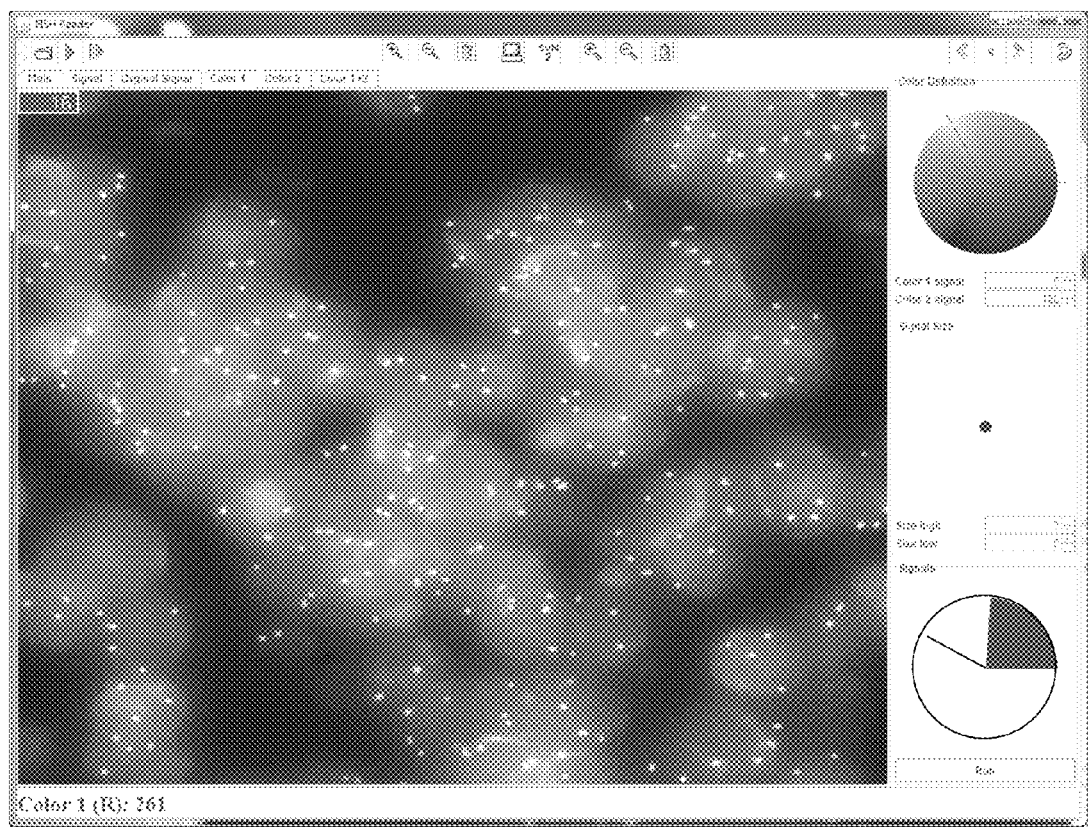
FIGS. 6a and 6b show the decomposition and signal detection for the red and green channels.
Figure 6B:
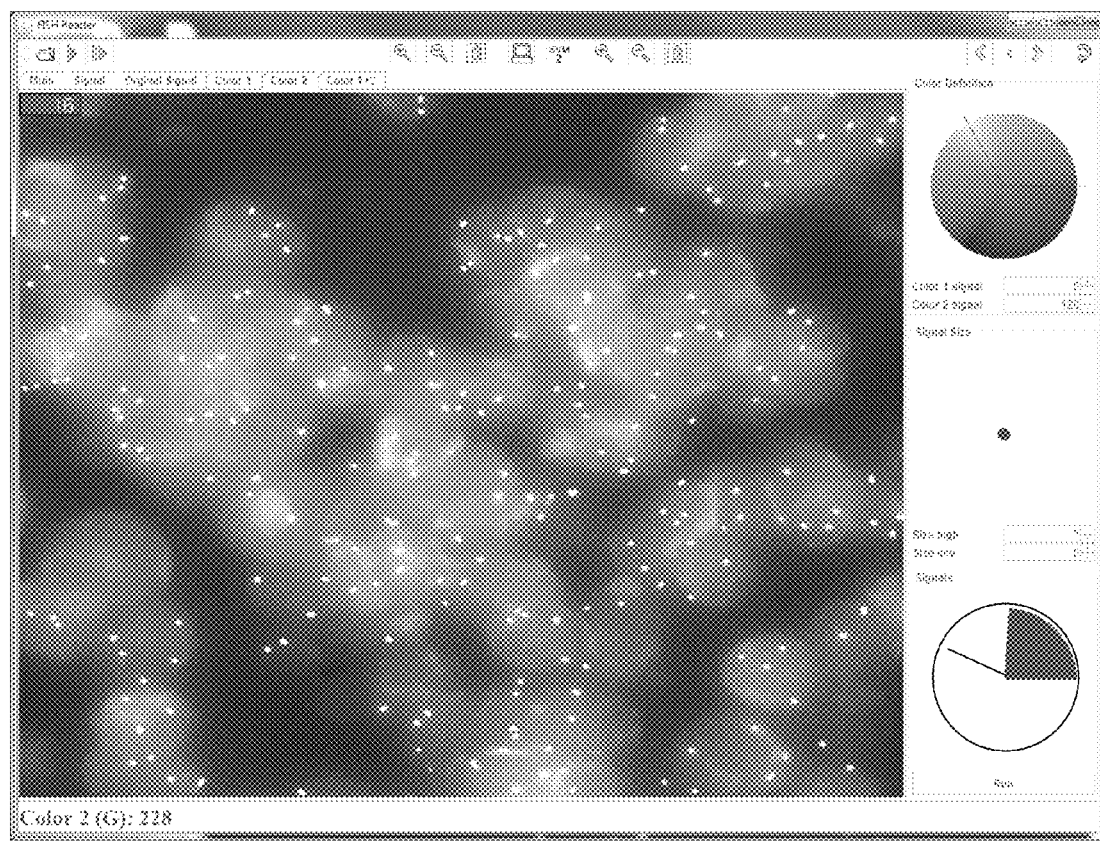
Figure 6C:
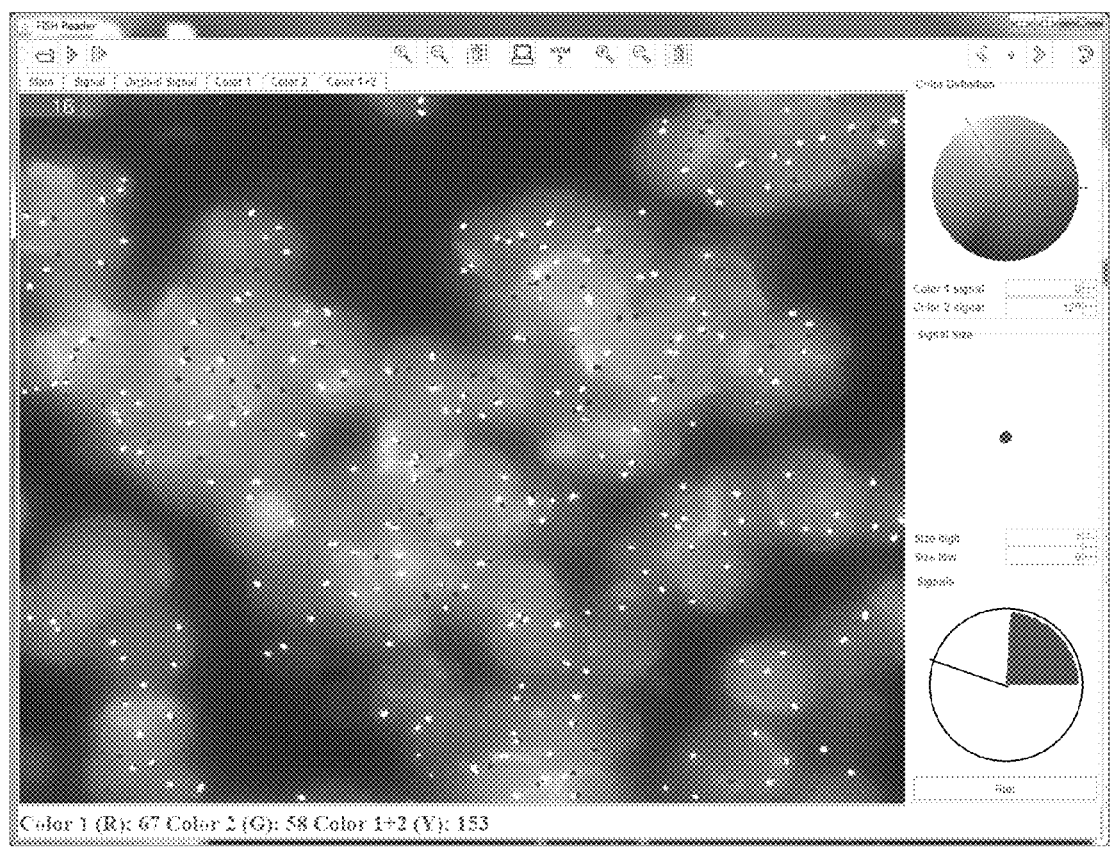
FIG. 6c shows the combined signals from the two channels.

FIGS. 6a and 6b provide examples of the decomposition and signal detection for the separated color channels. FIG. 6a shows the red channels and FIG. 6b shows the green channels. FIG. 6c shows the combined signals from the two channels.

An important aspect of image processing is obtaining the necessary features. In FISH images, the cells are usually not well defined and there are no clear boundaries. Overlapping among the cells is common, and frequently a cell will only be partially visible in the image. In steps 108a and 108b, feature extraction is performed to remove noise and separate the cell images to allow accurate classification. The following techniques are applied as part of the feature extraction process in steps 108:

Modified Hough Transform

The Hough transform is a standard tool in image analysis that allows recognition of global patterns in an image space by recognition of local patterns (ideally a point) in a transformed parameter space. It is particularly useful when the patters sought are sparsely digitized, have holes and/or the images are noisy. In the inventive method, the Hough transform is used to detect lines in a noisy image. Edge detection is performed first and the edge image is mapped to a parameter space of accumulators. The peaks in the parameter space represent the lines in the original image. Because a line can be defined with two parameters, the parameter space is two-dimensional.

The cells in FISH images have an approximately round or elliptical shape. A modified form of Hough transform is used to detect the shapes. Because the parameter space for ellipses is four-dimensional, a direct extension of Hough transform algorithm would significantly increase the computational complexity. To improve the efficiency, the algorithm is modified to limit the search in the parameter space to a smaller feasible region by taking advantage of the fact that the cells in the FISH images have constraints in their shape characteristics such as the size, eccentricity, and density.

The main advantage of the Hough transform-based algorithm is its ability to detect cell shapes from incomplete data and its insensitivity to noise.

Gaussian Mixture Model

A Gaussian Mixture Model (GMM) is a probability density function represented as a weighted sum of Gaussian component densities.

$$p(x) = \sum_{i=1}^{M} w_i g(x | \mu_i, \Sigma_i)$$

where x is a D-dimensional continuous-valued data vector (i.e., measurement of features), $w_i$, i=1, ..., M, are the mixture weights, and where $g(x|\mu_i, \Sigma_i)$, i=1, ..., M denotes a Gaussian density. (See, e.g., D. Reynolds, "Gaussian Mixture Models", *Encyclopedia of Biometric Recognition*, Springer, 2008.) GMM, which is widely used in contemporary image and vision analysis, is employed in the inventive system to model the cell distributions in a FISH image. Each cell in the image is represented by one Gaussian density. The mean vectors of the Gaussians correspond to the centers of the cells. The parameters are estimated from the image data using the well-known Expectation-Maximization (EM) algorithm. The EM algorithm is an iterative method for finding maximum likelihood or maximum a posteriori (MAP) estimates of parameters in statistical models, where the model depends on unobserved latent variables. The EM iteration alternates between performing an expectation (E) step, which creates a function for the expectation of the log-likelihood evaluated using the current estimate for the parameters, and a maximization (M) step, which computes parameters maximizing the expected log-likelihood found on the E step. These parameter-estimates are then used to determine the distribution of the latent variables in the next E step.

GMM is a simple and flexible model that has well established training algorithms and it able to handle the overlapping conditions naturally.

Markov Chain Monte Carlo

Markov random field (MRF) models have been applied to image spaces for image segmentation and restoration problems since the early 1970s. These models exploit the analogy between the very large spatial stochastic systems of digital images and the lattice-based systems of statistical mechanics. MRF is an n-dimensional random process defined on a discrete lattice (an undirected graph). Its full conditional distribution depends only on the neighbors in the lattice.

In graph theory, a clique in an undirected graph G=(V, E) is a subset of the vertex set $C \subseteq V$, such that for every two vertices in C, there exists an edge connecting the two. A Gibbs random field is characterized by the Gibbs distribution defined as $$P(X) = \frac{1}{Z} e^{U(X)/T}$$

where Z is a normalizing constant called the partition function, T is a constant called the temperature and U is the energy function. The energy $U(X) = \Sigma_{c \in C} V_c(X)$ is a sum of clique potentials Vc over all possible cliques in the lattice.

As is well known in the art, the Hammersley-Clifford theorem establishes the equivalence of Markov random field and Gibbs random field.

Markov Chain Monte Carlo (MCMC) methods are well-known sampling algorithms that provide efficient solutions to Markov random fields and other Bayesian type models.

In the present invention, stochastic models and MCMC sampling methods are used to segment cells and extract robust features from the FISH images. The advantages of this approach include noise resistance and the ability to incorporate prior information. Gibbs distributions, specified with associated energy functions, can be used to define the priors.

Such models and sampling methods can be implemented using the Image Processing Toolbox of MATLAB®, available from The MathWorks, Inc., Natick, Mass.

With the properly preprocessed data and extracted features, the decisions of the system can be made through a classifier. A kernel based machine learning system such as a support vector machine is well suited for this task.

Modern technological advancements have created a vast amount of data in many different forms. One of the greatest challenges presented to computer and information scientists by this information explosion is to develop effective methods to process large quantities of data and extract meaningful information. Traditional statistical methods, though effective on low dimensional data, have proven to be inadequate in processing the "new data" which are often characterized by high complexity and high dimensionality. In particular, the so called "curse of dimensionality" is a serious limitation on the classical statistical tools. Machine learning represents a promising new paradigm in data processing and analysis to overcome the limitations. It uses a "data-driven" approach to automatically "learn" a system, which can be used to make classifications or predictions on future data. Support Vector Machine (SVM) is a state-of-the-art machine learning technology that has revolutionized the field of machine learning and has provided real, effective solutions to many difficult data analysis problems.

SVM combines the concepts of an optimal hyperplane in a high-dimensional inner product space (often an infinite-dimensional Hilbert space) and a kernel function defined on the input space to achieve the flexibility of data representations, computational efficiency, and regularization on model capacities. SVM can be used to solve both classification (pattern recognition) and regression (prediction) problems. A typical SVM pattern recognition setting is given below.

Given a set of training data:

$x_i, y_i$ i=1, 2, ..., m

The SVM training can be formulated as a problem of finding an optimal hyperplane:

$$\min \frac{1}{2}\|w\|^2 + \frac{C}{m}\sum_{i=1}^{m} \xi_i,$$

$$\xi_i \geq 0,$$

$$y_i(<\Phi(x_i), w> +b) \geq 1 - \xi_i$$

Using Lagrange multipliers, it is transformed to the dual problem:

$$\max \sum_{i=1}^{m} \alpha_i - \frac{1}{2}\sum_{i,j=1}^{m} \alpha_i \alpha_j y_i y_j k(x_i, x_j),$$

$$\alpha_i \geq 0,$$

$$\sum_{i=1}^{m} \alpha_i y_i = 0$$

Solving the quadratic programming problem provides the SVM solution:

$$f(x) = \text{sgn}\left(\sum_{i=1}^{m} \alpha_i y_i k(x, x_i) + b\right)$$

Figure 7A:
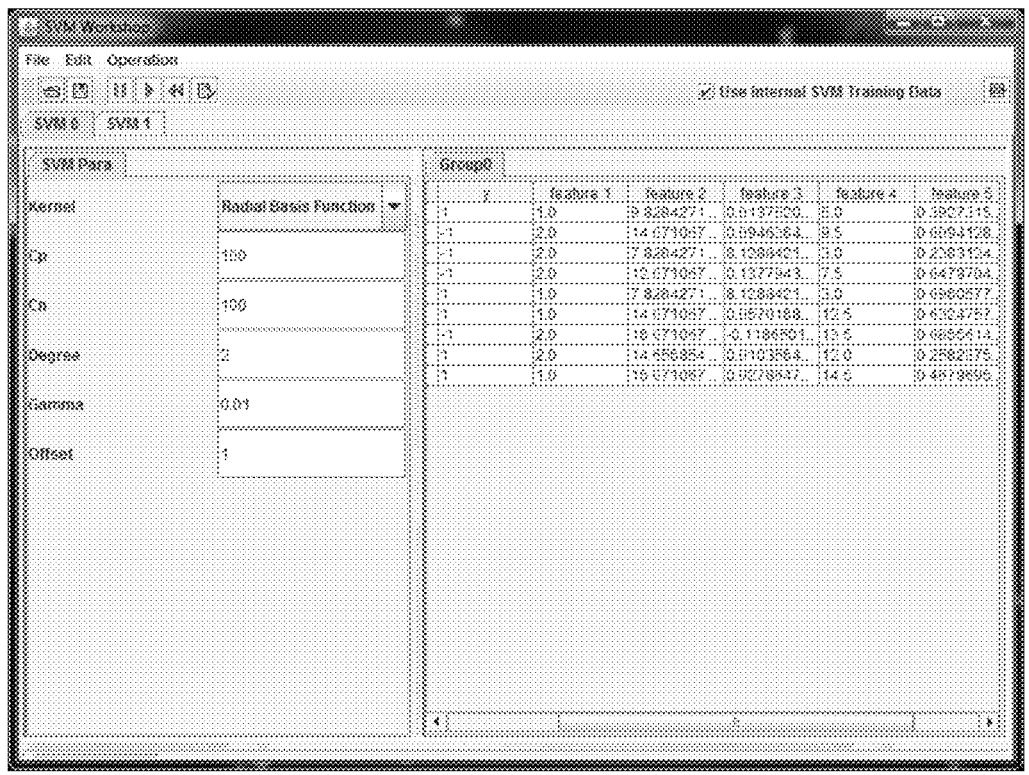
FIGS. 7a and 7b show the training windows for two SVMs in the program.
Figure 7B:
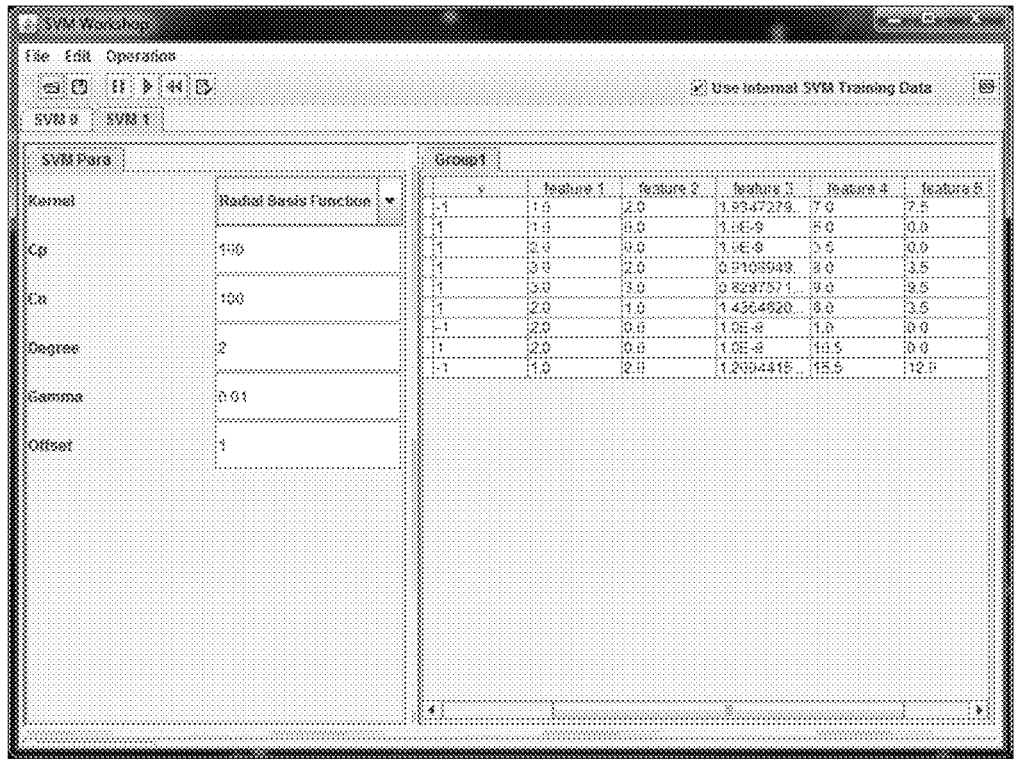

Referring again to FIG. 2, in the inventive automatic FISH reader system, multiple SVMs 110 and 112 are applied sequentially. The multiple SVM approach provides the flexibility and efficiency needed for a complex machine learning system. FIGS. 7a and 7b show the training windows of the SVMs 110 and 112.

Figure 8:
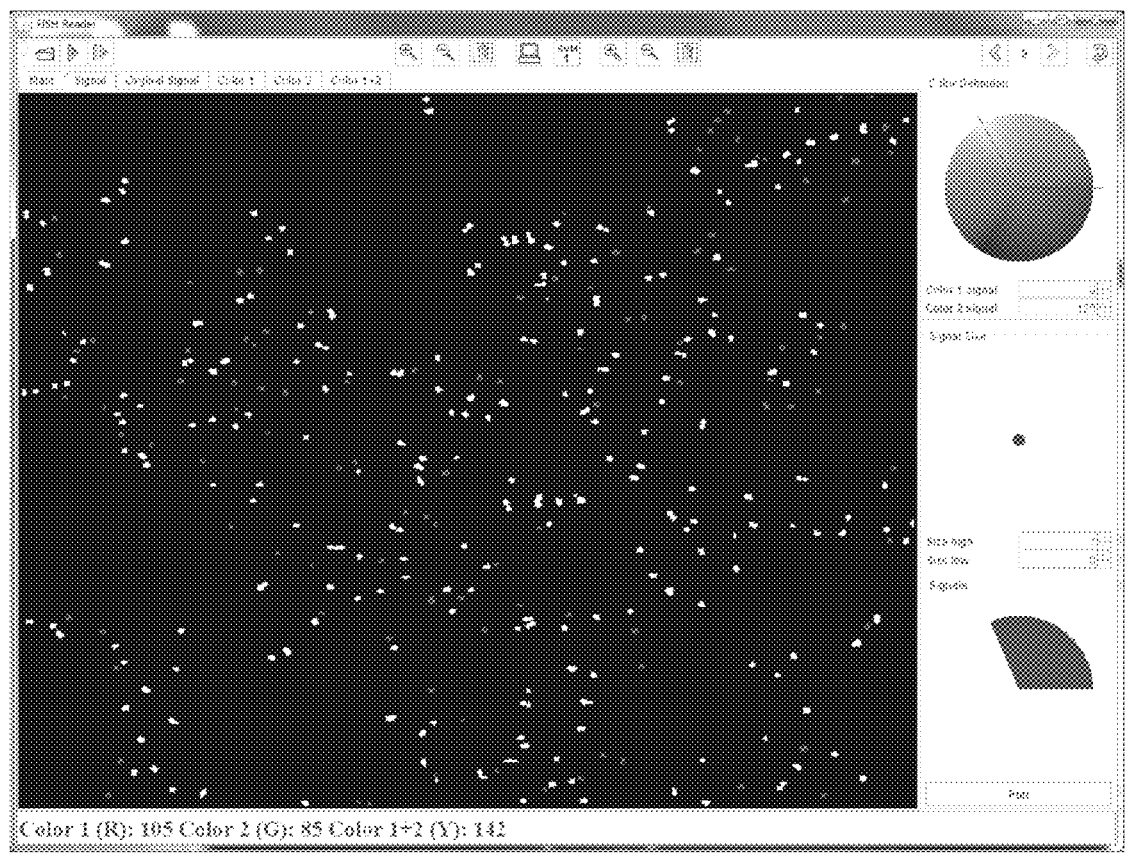
FIG. 8 shows an example of the color classification results after processing the signals with the first SVM.

The first SVM 110 ("SVM 1") determines the colors of individual signal spots. The input features to SVM 110 include:
  Intensity values for each color channel
  Preliminary color assignment
  Perimeter
  Area
  Eccentricity FIG. 8 provides an example of the color classification results after processing the signals with the first SVM 110.

The second SVM 112 ("SVM 2") determines the merging of separate but close signals. The input features to the SVM include:
  Distance between the two signals
  Current color assignments
  Areas of the two signals
  Intensity The merge relations among the signals can potentially be complex. In order to manage the relations in a general, flexible, and efficient way, a graph model is used to represent arbitrary merges.

Figure 9:
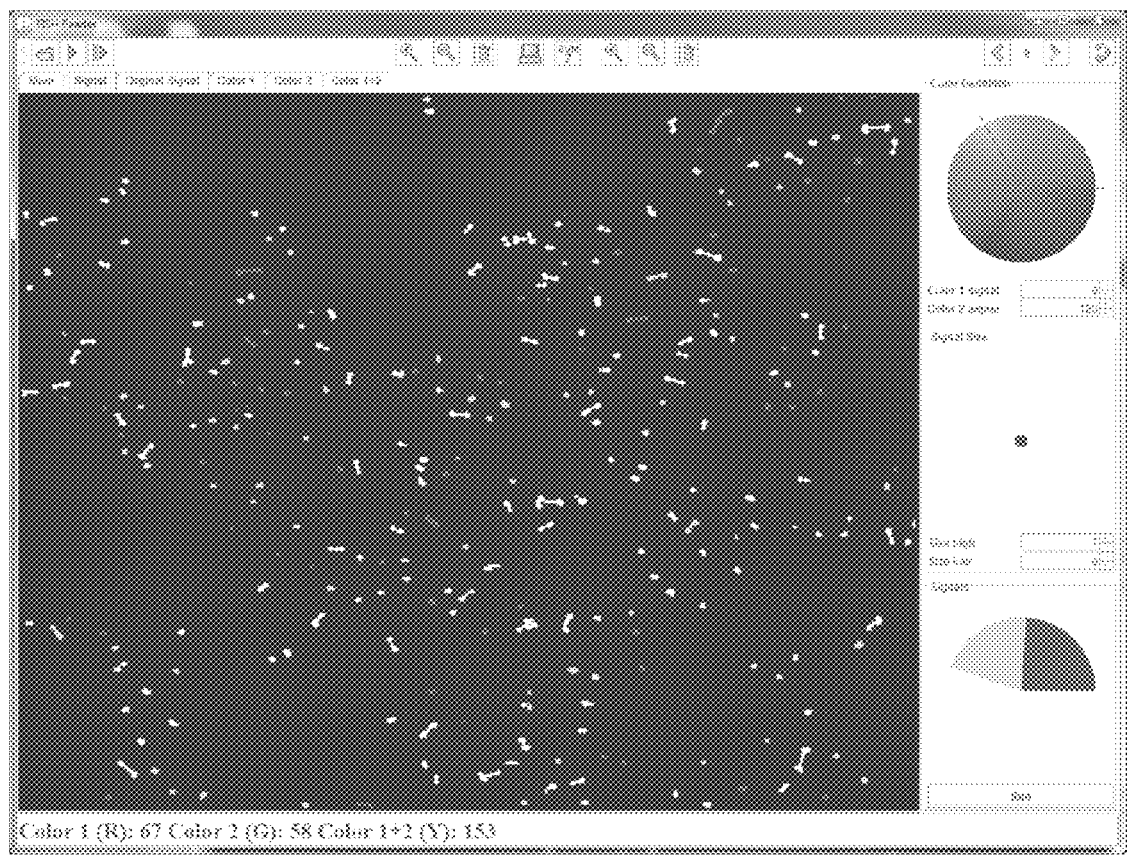
FIG. 9 shows an example of the color classification results after merging the signals with the second SVM.

FIG. 9 provides an example of the color classification results after merging the signals with the second SVM 112.

Referring against to FIG. 2, a third SVM 114 may be used for associating the FISH signals to the cells. For performing this analysis, features are extracted from the detected FISH signals, the detected cells, and the GMM cell distribution models. These features include the locations of the signals relative to the locations of the cells, the weights of the cells, the clustering among the signals, and the signal strength. Based on the extracted features, the SVM 114 makes an assessment on the likelihood of a specific signal belonging to a specific cell. The results of the association process will then be combined with the outputs of the other classifiers.

Figure 10:
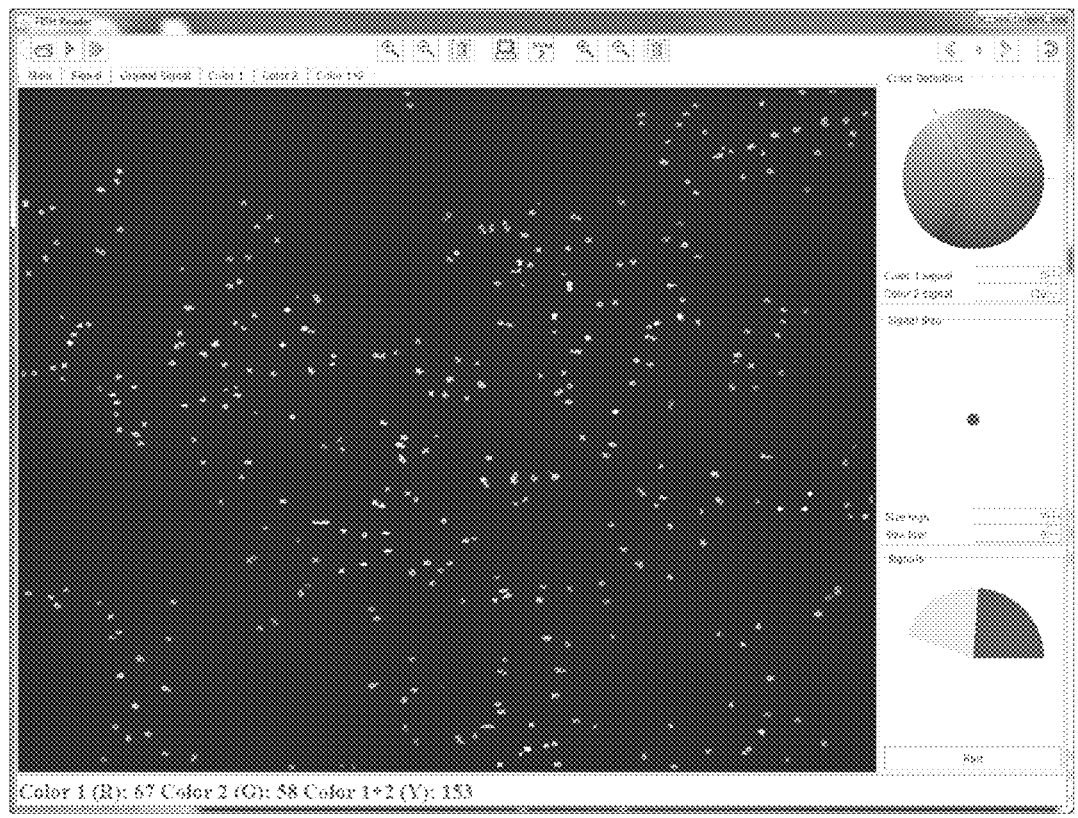
FIG. 10 shows another display with the detected signals in the original image colors.

The detected signals may be viewed in several different ways. As shown in the preceding figures, the single color channel results, merged signals, and individual SVM decisions can all be displayed to the user on the graphical interface. FIG. 10 shows another display with the detected signals in the original image colors.

Figure 11:
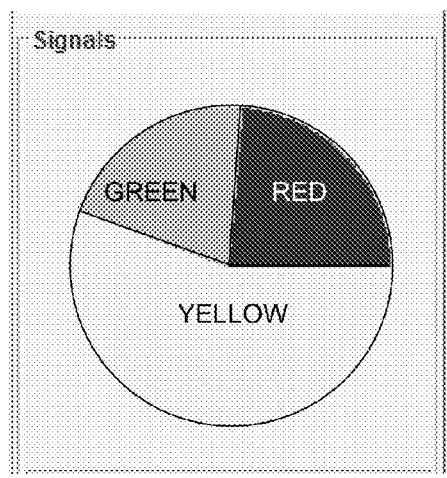
FIG. 11 shows a graphical chart indicating the relative frequencies of the color signals.

With all of the dots clearly separated, classified by color and associated with their appropriate cells, they can be easily counted using a conventional automated counting process. The statistics of signals of the different colors (step 116) are shown in all of the display panels. A graphical chart indicating the relative frequencies of the color signals is provided in FIG. 11. Results of the analysis, including all graphical displays, may be stored in the database where it can be associated with the corresponding raw data. The results may be transferred to another processor for generating a report in a format suitable for transmission to the ordering laboratory, pathologist, physician, researcher or facility, or may be combined with data generated from different test procedures on samples taken from the same patient for evaluation. For example, gene expression data, karyotyping results or other diagnostic procedures may be combined in a manner similar to that described in previously mentioned U.S. Pat. No. 6,996,549 of Zhang, et al. to provide a single comprehensive diagnostic evaluation based on multiple testing procedures.

The present invention may be implemented as software, firmware, hardware, or a combination thereof. While the exemplary embodiment is described as using support vector machine classifiers, other types of learning machines such as neural networks, decision trees, regression, or ensemble classifiers, may be used for performing the classification steps.

The system and method disclosed herein provides for the automation of FISH data reading, which not only increases efficiency, but also significantly reduces the subjectivity that inevitably occurs when different individuals of varying skill levels and sensitivities are called upon to evaluate data that is not clearly delineated. While such systems and methods may not replace highly trained pathologists as the primary interpreters of FISH data, they can provide an initial screening function to quickly identify samples that may be of particular interest to the pathologist, or they can provide a secondary analysis to quickly double-check samples that have already been screened by a cytotechnician or examined by a pathologist.

The invention claimed is:

1. An automated reader for reading fluorescence in-situ hybridization signals, comprising:
    one or more computer processors for receiving a digitized FISH image comprising a plurality of spots having colors, wherein the one or more processors being are programmed to execute the steps of:
    converting colors within the FISH image to a hue value;
    separately for each color:
    extracting a plurality of quantitative values to detect the presence of signals corresponding to spots; and
    applying a plurality of algorithms to extract features from the signals to determine cell shapes and segment cells within the FISH image;
    recombining the extracted features for the colors;
    using a first learning machine and a first subset of the extracted features, classifying the plurality of spots according to the color of each spot to generate spot classifications, wherein at least of portion of said spot classifications are associated with close proximity or partially overlapping spots within the FISH image and comprise merged signals;
    using a second learning machine and a second subset of the extracted features, separating said merged signals to generate separated spot classifications;
    counting said spot classifications and said separated spot classifications to determine relative frequency of colors among the plurality of spots; and
    generating a report of the number of classified spots of each color.

2. The automated reader of claim 1, wherein the first learning machine is a support vector machine.

3. The automated reader of claim 1, wherein the second learning machine is a support vector machine.

4. The automated reader of claim 1, wherein the plurality of algorithms to extract features comprises a Hough transform.

5. The automated reader of claim 1, wherein the plurality of algorithms to extract features comprises a Markov random field model.

6. The automated reader of claim 1, wherein the plurality of algorithms to extract features comprises a Gaussian mixture model.

7. The automated reader of claim 1, wherein the one or more processor is further programmed to execute a third learning machine to associate signals with cells within the FISH image.

8. The automated reader of claim 1, further comprising a user interface comprising a masking tool for manually selecting one or more regions within the FISH image for analysis.

9. The automated reader of claim 8, wherein the masking tool is further operable for excluding one or more regions within the FISH images from analysis.

10. A method for reading fluorescence in-situ hybridization signals, comprising:
    receiving in one or more computer processors a digitized FISH image comprising a plurality of spots having colors;
    converting colors within the FISH image to a hue value;
    separately for each color:
    extracting a plurality of quantitative values to detect the presence of signals corresponding to spots; and
    applying a plurality of algorithms to extract features from the signals to determine cell shapes and segment cells within the FISH image; recombining the extracted features for the colors;
    using a first learning machine and a first subset of the extracted features, classifying the plurality of spots according to the color of each spot to generate spot classifications, wherein at least of portion of said spot classifications are associated with close proximity or partially overlapping spots within the FISH image and comprise merged signals;
    using a second learning machine and a second subset of the extracted features, separating said merged signals to generate separated spot classifications;
    counting said spot classifications and said separated spot classifications to determine relative frequency of colors among the plurality of spots; and
    generating a report of the number of classified spots of each color.

11. The method of claim 10, wherein the first learning machine is a support vector machine.

12. The method of claim 10, wherein the second learning machine is a support vector machine.

13. The method of claim 10, wherein the plurality of algorithms to extract features comprises a Hough transform.

14. The method of claim 10, wherein the plurality of algorithms to extract features comprises a Markov random field model.

15. The method of claim 10, wherein the plurality of algorithms to extract features comprises a Gaussian mixture model.

16. The method of claim 10, wherein the one or more processor is further programmed to execute a third learning machine to associate signals with cells within the FISH image.

17. The method of claim 10, further comprising a user interface comprising a masking tool for manually selecting one or more regions within the FISH image for analysis.

18. The method of claim 17, wherein the masking tool is further operable for excluding one or more regions within the FISH images from analysis.

19. The method of claim 1, wherein the first subset of the extracted features comprises an intensity value for each color, a preliminary color assignment, a spot perimeter, a spot area, and a spot eccentricity.

20. The method of claim 1, wherein the second subset of the extracted features comprises a distance between two signals, current color assignments, areas of the two signals, and signal intensity for the two signals.

21. The method of claim 10, wherein the first subset of the extracted features comprises an intensity value for each color, a preliminary color assignment, a spot perimeter, a spot area, and a spot eccentricity.

22. The method of claim 10, wherein the second subset of the extracted features comprises a distance between two signals, current color assignments, areas of the two signals, and signal intensity for the two signals.

\* \* \* \* \*